United States Patent
Tsuruya et al.

(10) Patent No.: US 7,196,913 B2
(45) Date of Patent: Mar. 27, 2007

(54) DC CONVERSION APPARATUS

(75) Inventors: Mamoru Tsuruya, Niiza (JP); Shinji Aso, Niiza (JP); Makoto Sato, Niiza (JP)

(73) Assignee: Sanken Electric Co., Ltd., Niiza (JP)

( * ) Notice: Subject to any disclaimer, the term of this patent is extended or adjusted under 35 U.S.C. 154(b) by 0 days.

(21) Appl. No.: 11/302,184

(22) Filed: Dec. 14, 2005

(65) Prior Publication Data
US 2006/0139968 A1 Jun. 29, 2006

(30) Foreign Application Priority Data
Dec. 28, 2004 (JP) ............................. 2004-381758

(51) Int. Cl.
*H02M 3/335* (2006.01)
(52) U.S. Cl. ...................... 363/21.06; 363/53; 363/127
(58) Field of Classification Search ................ 363/20, 363/21.01, 21.04, 21.06, 21.12, 21.14, 56.1, 363/56.11, 89, 97, 127, 131, 21.08, 21.16, 363/52, 53, 56.12
See application file for complete search history.

(56) References Cited

U.S. PATENT DOCUMENTS

| | | | | |
|---|---|---|---|---|
| 6,011,703 A | * | 1/2000 | Boylan et al. | 363/21.06 |
| 6,191,964 B1 | * | 2/2001 | Boylan et al. | 363/89 |
| 7,038,922 B2 | * | 5/2006 | Diallo et al. | 363/21.06 |
| 7,057,906 B2 | * | 6/2006 | Tamura | 363/21.04 |
| 2006/0139969 A1 | * | 6/2006 | Tsuruya | 363/21.06 |

FOREIGN PATENT DOCUMENTS

JP   2002-10636   1/2002

OTHER PUBLICATIONS

U.S. Appl. No. 11/302,184, filed Dec. 14, 2005, Tsuruya et al.
U.S. Appl. No. 11/355,166, filed Feb. 16, 2006, Aso et al.
U.S. Appl. No. 11/357,161, filed Feb. 21, 2006, Aso et al.
U.S. Appl. No. 11/369,871, filed Mar. 8, 2006, Aso et al.
U.S. Appl. No. 11/302,234 filed Dec. 14, 2005, Tsuruya.
U.S. Appl. No. 11/302,184 filed Dec. 14, 2005, Tsuruya et al.

* cited by examiner

*Primary Examiner*—Gary L Laxton
(74) *Attorney, Agent, or Firm*—Oblon, Spivak, McClelland, Maier & Neustadt, P.C.

(57) ABSTRACT

A DC conversion apparatus includes a switch converting a DC voltage of a DC power source to a high-frequency voltage by being turned ON/OFF via a primary winding of a transformer, a series circuit of a switch and a clamp capacitor being connected to both ends of the primary winding, a synchronous rectifying circuit performing synchronous rectification of a high-frequency voltage generated at a secondary winding, a smoothing circuit smoothing a rectified output of the synchronous rectifying circuit by a smoothing reactor and a smoothing capacitor, a capacitor storing energy stored in the smoothing reactor due to a current backflow of the synchronous rectifying circuit caused under light load condition, a switch being turned ON in synchronization with the switch and returning the energy stored in the capacitor to the clamp capacitor on the primary side via the transformer, and a control circuit turning the switch and the switch ON/OFF states alternately.

12 Claims, 10 Drawing Sheets

DC CONVERSION APPARATUS

BACKGROUND OF THE INVENTION

The present invention relates to a highly efficient and compact DC conversion apparatus such as a DC/DC converter.

FIG. 1 is a circuit configuration diagram of a conventional DC conversion apparatus. In the DC conversion apparatus shown in FIG. 1, a synchronous rectifier that includes a low ON-resistance power MOSFET (Field Effect Transistor) and the like is used on a secondary side (output side) of a transformer in order to reduce power losses.

In FIG. 1, a MOSFET switch Q1 is connected to a DC power source Vdc1 via a primary winding 5a (the number of turns: n1) of a transformer T1, and a series circuit of a resistor R1 and a capacitor C1 is connected to both ends of the switch Q1. A series circuit of a diode D2 and a capacitor C2 is connected to both ends of the primary winding 5a of the transformer T1, and a resistor R2 is connected to both ends of the capacitor C2. The switch Q1 is turned ON/OFF by PWM control of a control circuit 10.

The primary winding 5a of the transformer T1 and a secondary winding 5b (with a number of turns of n2) of the transformer T1 each have a winding structure such that a common mode voltage is generated mutually, and a MOSFET switch Q3 and a MOSFET switch Q4 are connected in series to both ends of the secondary winding 5b of the transformer T1. One end of the secondary winding 5b (filled circle (○) side) of the transformer T1 is connected to a gate of the switch Q4, and the other end thereof is connected to a gate of the switch Q3. The switch Q3 is connected to a diode D3 in parallel, and the switch Q4 is connected to a diode D4 in parallel. These devices form a synchronous rectifying circuit. This synchronous rectifying circuit rectifies a voltage (i.e. ON/OFF-controlled pulse voltage) generated at the secondary winding 5b of the transformer T1 in synchronization with ON/OFF operations of the switch Q1, and outputs a DC voltage.

A smoothing reactor Lo and a smoothing capacitor Co are connected in series to both ends of the switch Q3 to form a smoothing circuit. This smoothing circuit smoothes a rectified output of the synchronous rectifying circuit, and outputs a DC output to a load RL.

The control circuit 10 controls the switch Q1 in ON/OFF manner so that the width of an ON-pulse applied to the switch Q1 is narrowed when the output voltage of the load RL reaches or exceeds a reference voltage. That is, when the output voltage of the load RL reaches or exceeds the reference voltage, the width of the ON-pulse applied to the switch Q1 is shortened so as to control the output voltage to a constant voltage.

Operations of the DC conversion apparatus thus configured are explained with reference to a timing chart at light load time shown in FIG. 2. In FIG. 2, a drain-source voltage of the switch Q1 is depicted by Q1v, a drain current of the switch Q1 is depicted by Q1i, a drain current of the switch Q3 is depicted by Q3i, a drain current of the switch Q4 is depicted by Q4i, a drain-source voltage of the switch Q3 is depicted by Q3v, and a gate voltage signal of the switch Q1 is depicted by Q1g.

Operations performed at heavy load time are explained first. When the switch Q1 is turned ON by the gate voltage signal Qg, the current Q1i flows through a path passing along Vdc1, 5a, Q1, and Vdc1. This current Q1i increases linearly as time passes.

At this time, since a voltage is generated also at the secondary winding 5b of the transformer T1, the switch Q4 is turned ON and hence the current Q4i flows clockwise through a path passing along 5b, Lo, Co, Q4, and 5b, so that electric power is supplied to the load RL. The current Q4i increases linearly as time passes, whereupon Lo (Io) 2/2 of energy is stored in the smoothing reactor Lo. A current flowing into the smoothing rector Lo is depicted by Io.

Next, when the switch Q1 is turned OFF, the voltage at the secondary winding 5b of the transformer T1 is reversed, and hence the switch Q4 is turned OFF and the switch Q3 is turned ON. Therefore, the energy stored in the smoothing reactor Lo causes the current Q3i to flow clockwise through a path passing along Lo, Co, Q3, and Lo, so that electric power is supplied continuously to the load RL.

Subsequently, when the switch Q1 is turned ON, the voltage generated at the secondary winding 5b is reversed again, therefore the switch Q4 is turned ON and the switch Q3 is turned OFF, and then the similar operations as described above are performed. This state is called a continuous mode because the current of the smoothing reactor Lo flows continuously in the same direction.

On the other hand, when a load current decreases (in a case of light load), the current of the smoothing reactor Lo flowing therethrough as the switch Q1 is turned OFF (e.g., time t32) becomes zero while the switch Q1 is OFF, but the switch Q3 remains ON. Therefore, the electric charge stored in the smoothing capacitor Co is discharged, and then a current Q3i' flows counterclockwise through a path passing along Co, Lo, Q3, and Co, so that the energy is stored in the smoothing reactor Lo.

When the switch Q1 is turned ON at time t33 (same as time t31), the switch Q4 is turned ON and the switch Q3 is turned OFF. Therefore, a current Q4i' flows counterclockwise through a path passing along Lo, 5b, Q4, Co, and Lo from the smoothing reactor Lo. As a result, the energy is finally returned to the DC power source Vdc1 on a primary side (input side) via the primary winding 5a of the transformer T1.

As described above, when a synchronous rectifying circuit is applied to the conventional DC conversion apparatus shown in FIG. 1 or to a switching power supply device described in Patent Document 1, they operate with little loss in a heavy load state in which a current flows continuously through the smoothing reactor Lo.

A related art of the conventional switching power supply device is disclosed in, for example, Japanese Patent Application Laid-Open No. 2002-10636.

SUMMARY OF THE INVENTION

In a light load state as shown in FIG. 2, however, a current of the smoothing reactor Lo flowing therethrough is not continuous and flows backward in a return mode. When the switch Q3 is OFF, the energy stored in the smoothing reactor Lo is returned to the DC power source Vdc1 on the input side via the switch Q4 and the transformer T1.

At this time, delay of an ON-timing of the switch Q4 or high leakage inductance of the transformer T1 generates a large spike voltage SP as shown in FIG. 2, causing a breakdown of devices (synchronous rectifier).

In order to solve this problem, a spike voltage absorbing circuit such as an absorber having a combination of the resistor R1 and the capacitor C1, and a combination of the resistor R2 and the capacitor C2 should be additionally provided with the apparatus. Furthermore, the reverse current is detected to stop the synchronous rectification, or high withstand voltage devices are used. These measures lead to complex circuitry and increased losses.

According to the present invention, a DC conversion apparatus that offers high efficiency and achieve a size reduction by reducing losses and simplifying the circuitry can be provided.

The present invention adopts following means to solve the above problems. A first technical aspect of the present invention provides a DC conversion apparatus comprising: a first switch configured to carry out ON/OFF operations via a primary winding of a transformer to convert a DC voltage provided by a DC power source into a high-frequency voltage; a series circuit of a second switch and a clamp capacitor, the series circuit being connected to both ends of the primary winding of the transformer or to both ends of the first switch; a synchronous rectifying circuit configured to carry out synchronous rectification of a high-frequency voltage generated at a secondary winding of the transformer; a smoothing circuit having a smoothing reactor and a smoothing capacitor configured to smooth a rectified output of the synchronous rectifying circuit and outputs a DC voltage; a capacitor configured to storage energy being stored in the smoothing reactor and transferred thereto via a diode due to a current backflow of the synchronous rectifying circuit under light load condition; a third switch configured to turn ON in synchronization with the second switch and to return the energy stored in the capacitor to the clamp capacitor on the primary side via the transformer; and a control circuit turning the first switch and the second switch ON/OFF states alternately.

A second technical aspect of the present invention provides the DC conversion apparatus, in addition to the first technical aspect, wherein the smoothing reactor is formed on an auxiliary winding of the transformer, the secondary winding of the transformer is tightly coupled with the primary winding of the transformer, and the auxiliary winding of the transformer is loosely coupled with the primary winding.

A third technical aspect of the present invention provides the DC conversion apparatus, in addition to the second technical aspect, wherein the number of turns of the secondary winding of the transformer is the same as that of the auxiliary winding, the secondary winding has a winding phase opposite to that of the primary winding of the transformer, and the auxiliary winding has the same winding phase as that of the primary winding.

A fourth technical aspect of the present invention provides the DC conversion apparatus, in addition to the first to the fourth technical aspects, further comprising a tertiary winding of the transformer being connected to the secondary winding of the transformer in series, wherein the third switch is turned ON by a voltage generated at the tertiary winding of the transformer as the second switch is turned ON and the energy stored in the capacitor is returned to the clamp capacitor on the primary side via the transformer.

A fifth technical aspect of the present invention provides the DC conversion apparatus, in addition to the fourth technical aspect, wherein the tertiary winding of the transformer has a winding phase opposite to that of the primary winding of the transformer.

A sixth technical aspect of the present invention provides the DC conversion apparatus, in addition to the first to the fifth technical aspects, further comprising an ON-time setting means setting an ON-time of the third switch to be shorter than that of the second switch.

A seventh technical aspect of the present invention provides the DC conversion apparatus, in addition to the first to the sixth technical aspects, wherein the synchronous rectifying circuit has a parallel circuit of a synchronous rectifying device and a rectification device being connected to one end of the secondary winding of the transformer and to one end of the smoothing capacitor, and also has a second diode being connected to a joint of the one end of the secondary winding and a cathode of the rectification device, and to one end of the capacitor, and upon recovery phase of the rectification device, the recovery energy is absorbed in the capacitor via the second diode.

DESCRIPTION OF THE PREFERRED EMBODIMENTS

Embodiments of a DC conversion apparatus according to the present invention will be explained in detail below with reference to the accompanying drawings. According to the DC conversion apparatus of the embodiments, a spike voltage is eliminated in such that energy stored in a smoothing reactor is transferred to a capacitor via a diode utilizing a current backflow caused under light load condition, and the energy is returned to a clamp capacitor on a primary side without any power loss by use of a third switch which is turned ON synchronously as a second switch is turned ON. Furthermore, the DC conversion apparatus of the embodiments suppresses a spike voltage caused by recovery of rectifying devices provided in a synchronous rectifying circuit.

First Embodiment

Figure 1:
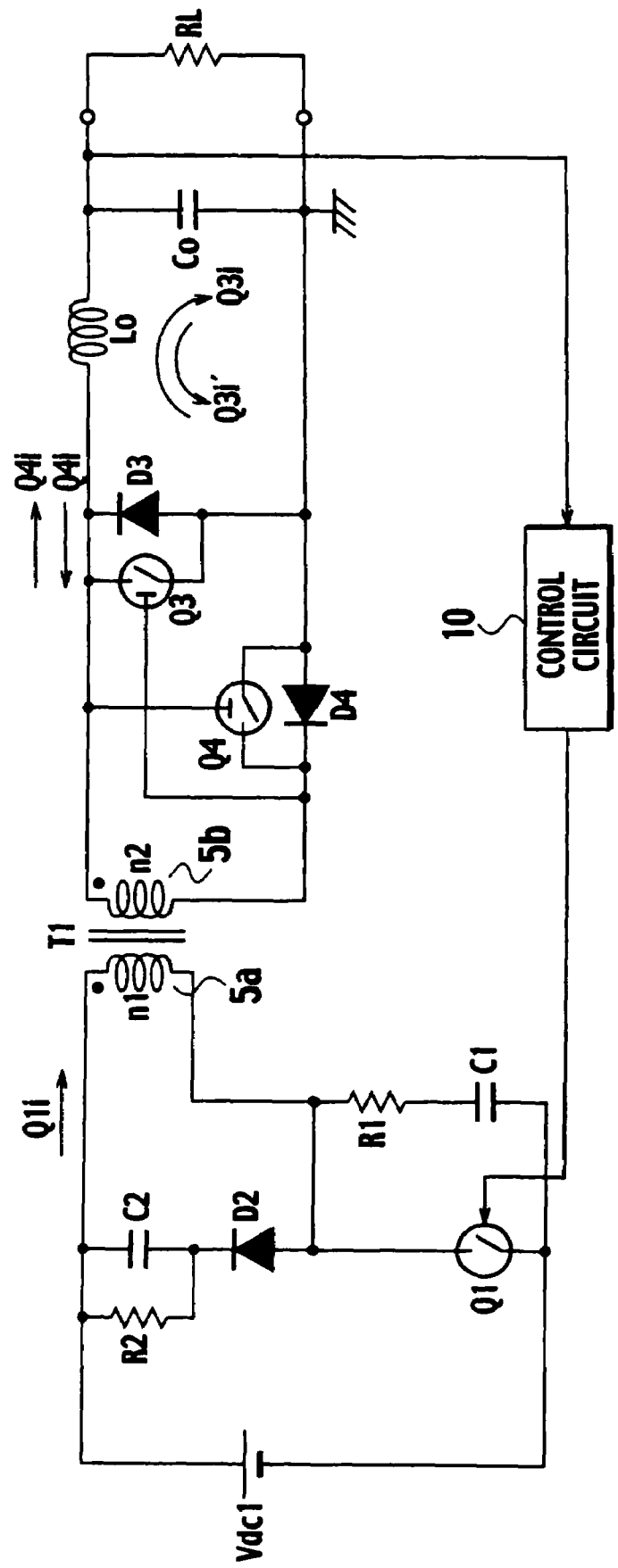
FIG. 1 is a circuit configuration diagram of a conventional DC conversion apparatus.
Figure 2:
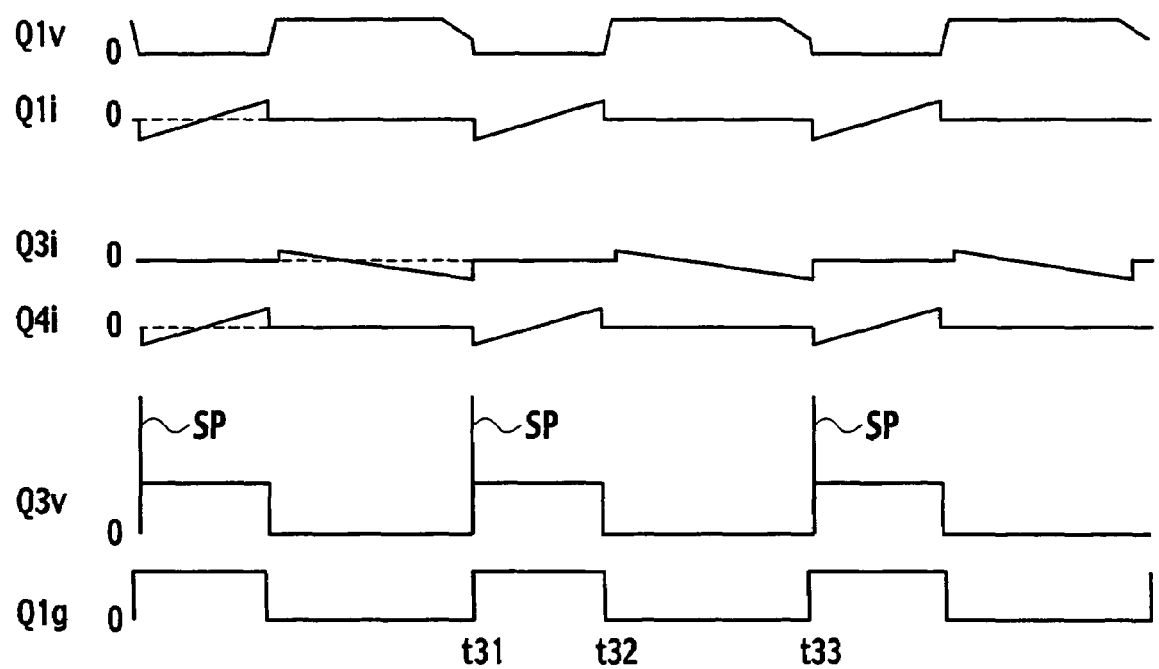
FIG. 2 is a timing chart of signal of each component under light load of the DC conversion apparatus shown in FIG. 1.
Figure 3:
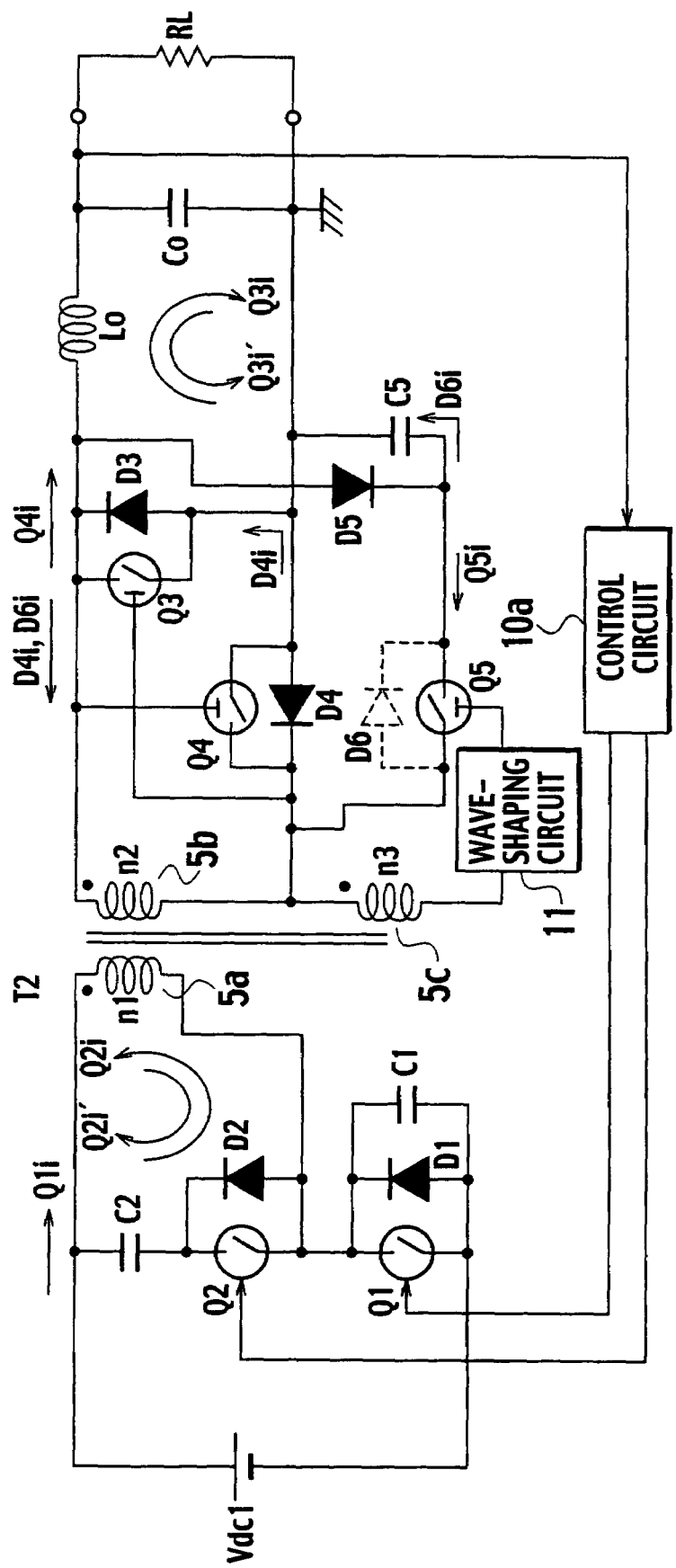
FIG. 3 is a circuit configuration diagram of a DC conversion apparatus according to a first embodiment.

FIG. 3 is a circuit configuration diagram of a DC conversion apparatus in a first embodiment shown in FIG. 3, a MOSFET switch Q1 (first switch) is connected to a DC power source Vdc1 via a primary winding 5a (the number of turns is n1) of a transformer T2, and a diode D1 and a capacitor C1 are connected in parallel to both ends of the switch Q1. The diode D1 can be a parasitic diode of the switch Q1, and the capacitor C1 can have a parasitic capacity of the switch Q1. One end of a MOSFET switch Q2 (second switch) is connected to a joint of one end of the primary winding 5a of the transformer T2 and one end of the switch Q1, and the other end of the switch Q2 is connected to a positive electrode of the DC power source Vdc1 via a clamp capacitor C2. Alternatively, the other end of the switch Q2 can be connected to a negative electrode of the DC power source Vdc1 via the clamp capacitor C2.

A MOSFET switch Q3 and a MOSFET switch Q4 are connected in series to both ends of a secondary winding 5b of the transformer T2. One end (filled circle side) of the secondary winding 5b of the transformer T2 is connected to a gate of the switch Q4, and the other end thereof is connected to a gate of the switch Q3. The switch Q3 is connected to a diode D3 in parallel, and the switch Q4 is connected to a diode D4 in parallel. The configuration of these devices performs a synchronous rectifier. The synchronous rectifying circuit rectifies a voltage (ON/OFF-controlled pulse voltage) generated at the secondary winding 5b of the transformer T2 by ON/OFF operations of the switches Q3 and Q4 performed in synchronization with ON/OFF operations of the switch Q1, and outputs a DC voltage.

A diode D2 is connected in parallel to both ends of the switch Q2. The diode D2 can be a parasitic diode of the switch Q2. The switches Q1 and Q2 have common periods being turned OFF (dead time), and are alternately turned ON/OFF by PWM control of a control circuit 10a.

The transformer T2 has the primary winding 5a, the secondary winding 5b (the number of turns is n2) that is tightly coupled with the primary winding 5a and is configured to generate a common mode voltage, and a tertiary winding 5c (the number of turns is n3) that is tightly coupled with the primary winding 5a and is configured to generate a reverse mode voltage. The secondary winding 5b and the tertiary winding 5c are connected in series.

The reverse mode voltage of the tertiary winding 5c described herein means that the tertiary winding 5c has a winding structure with respect to the primary winding 5a configured to turn OFF as the switch Q1 being ON and turn ON as the switch Q1 being OFF.

The anode of a diode D5 is connected to one end of the secondary winding 5b, the cathode of the diode D3, and one end of the smoothing reactor Lo. The cathode of the diode D5 is connected to one end of a capacitor C5, and the other end of the capacitor C5 is connected to one end of the smoothing capacitor Co and the anodes of the diodes D3 and D4. A joint of the cathode of the diode D5 and one end of the capacitor C5 is connected to one end (drain) of a MOSFET switch Q5 (third switch) and the cathode of a diode D6, and the other end (source) of the switch Q5 and the anode of the diode D6 are connected to a joint of the secondary winding 5b and the tertiary winding 5c, and the cathode of the diode D4. The gate of the switch Q5 is connected to one end (no circle side) of the tertiary winding 5c via a waveform shaping circuit 11 serving as an ON-time setting unit.

The diode D6 is connected between the drain and the source of the switch Q5. This diode D6 is provided to suppress a spike voltage by absorbing energy of the spike voltage generated at recovery time of the diode D4 in the capacitor C5. Specifically, a recovery current D4i flows counterclockwise through a path passing along D3, 5b, D4, and D3 at the recovery time of the diode D4, but by causing a current D6i to flow counterclockwise through a path passing along D3, 5b, D6, C5, and D3, the spike voltage generated at the recovery time of the diode D4 is suppressed.

Figure 4:
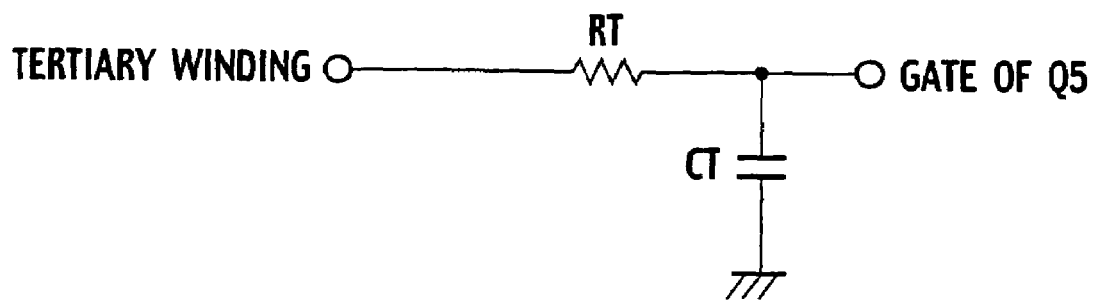
FIG. 4 is a diagram of an example of a waveform shaping circuit provided in the DC conversion apparatus according to the first embodiment.
Figure 5:
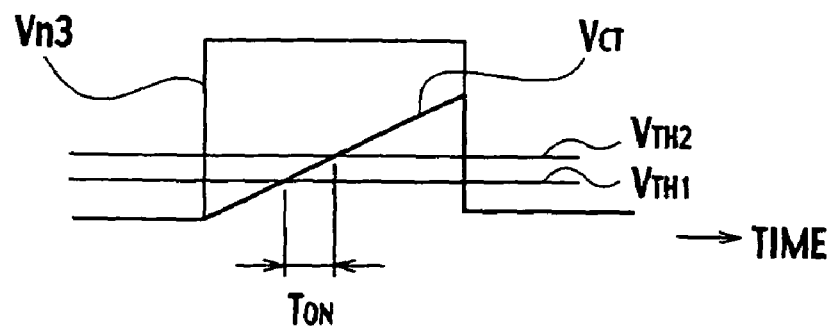
FIG. 5 is a diagram of an operational waveform of the waveform shaping circuit shown in FIG. 4.

The waveform shaping circuit 11 shapes the waveform of a voltage generated at the tertiary winding 5c of the transformer T2, so as to set a drive voltage applied to the gate of the switch Q5 being shorter than an ON-time of the switch Q2. FIG. 4 is an example of the waveform shaping circuit 11. The waveform shaping circuit 11 has a time-constant that is determined according to a resistor RT, which having one end thereof connected to the tertiary winding 5c and the other end thereof connected to the gate of the switch Q5, and a capacitor CT connected between the other end of the resistor RT and the ground.

The time-constant circuit having the resistor RT and the capacitor CT linearly increases the waveform of a voltage VCT across the capacitor CT in response to an input rectangular voltage waveform Vn3 of the tertiary winding 5c and applies this voltage VCT to the gate of the switch Q5, thereby the switch Q5 is turned ON only when the voltage VCT falls within a range between a first threshold voltage VTH1 and a second threshold voltage VTH2 of the gate of the switch Q5.

The control circuit 10a alternately turns ON/OFF the switches Q1 and Q2 in such a way that the width of an ON-pulse applied to the switch Q1 is narrowed and the width of an ON-pulse applied to the switch Q2 is widened as an output voltage of a load RL reaches or exceeds a reference voltage.

The control circuit 10a turns the switch Q1 ON state during a predetermined period of time after the switch Q1 reaches a zero-voltage condition due to resonance of the capacitor C1 connected to the switch Q1 in parallel and a leakage inductance (not shown) of the primary winding and the secondary winding of the transformer T2.

Figure 6:
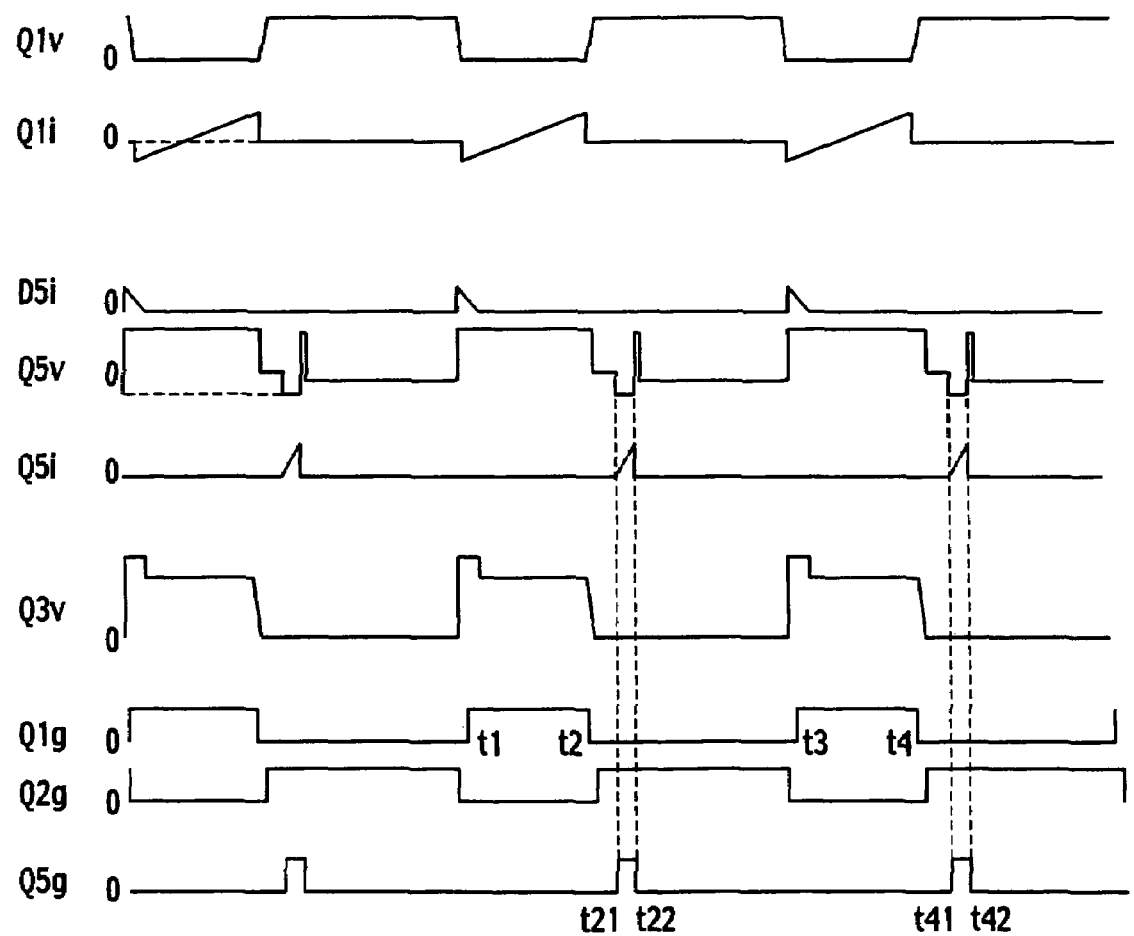
FIG. 6 is a signal timing chart of each component under light load of the DC conversion apparatus according to the first embodiment.

Operations of the DC conversion apparatus according to the first embodiment will be explained next with reference to a timing chart under light load condition shown in FIG. 6. In FIG. 6, a drain-source voltage of the switch Q1 is depicted by Q1v, a drain current of the switch Q1 is depicted by Q5i, a current flowing through the diode D5 is depicted by D5i, a drain-source voltage of the switch Q5 is depicted by Q5v, a drain current of the switch Q5 is depicted by Q5i, a drain-source voltage of the switch Q3 is depicted by Q3v, a gate voltage signal of the switch Q1 is depicted by Q1g, a gate voltage signal of the switch Q2 is depicted by Q2g, and a gate voltage signal of the switch Q5 is depicted by Q5g, respectively.

When the switch Q2 is turned OFF, resonance is produced by the capacitor C1 and a leakage inductance existing between the primary and the secondary windings of the transformer T2, and then the voltage Q1v of the switch Q1 decreases. And the voltage Q1v of the switch Q1 becomes zero as the switch Q1 is turned ON, thus zero-voltage switching of the switch Q1 is achieved.

Next, when the switch Q1 is turned ON, the current Q1i flows clockwise through a path passing along Vdc1, 5a, Q1, and Vdc1. At this time, since a voltage is generated also at the secondary winding 5b of the transformer T2, the switch Q4 is turned ON and the current Q4i flows clockwise through a path passing along 5b, Lo, Co, Q4, and 5b, so that electric power is supplied to a load RL. At this time, Lo (Io) 2/2 of energy is stored in the smoothing reactor Lo, wherein Io is a current flowing into the smoothing reactor.

Subsequently, when the switch Q1 is turned OFF, a current flows due to exciting energy stored at the primary winding 5a, and then the capacitor C1 is charged. At this time, resonance is produced by the capacitor C1 and the leakage inductance between the primary and the secondary windings of the transformer T2, so that the voltage Q1v of the switch Q1 increases.

When the electrical potential of the switch Q1 reaches that of the clamp capacitor C2, the diode D2 becomes conductive, and the clamp capacitor C2 starts to be charged. At this time, zero-voltage switching of the switch Q2 is achieved by turning ON the switch Q2. Furthermore, the voltage of the secondary winding 5b of the transformer T2 is reversed, and therefore the switch Q4 is turned OFF and the switch Q3 is turned ON. As a result, the current Q3i flows clockwise through a path passing along Lo, Co, Q3, and Lo due to the energy stored in the smoothing reactor Lo, so that the electric power is continuously supplied to the load RL. When the switch Q2 is turned ON, the current Q2i flows through a path passing along C2, Q2, 5a, and C2, and finally the energy is returned to the primary winding 5a.

In a case where a load current decreases (under light load condition), the current of the smoothing reactor Lo flowing therethrough when the switch Q1 is turned OFF (e.g., time t2) becomes zero and the level is kept while the switch Q1 is OFF, whereas the switch Q3 remains ON state. Therefore, the electric charge stored in the smoothing capacitor Co is discharged, and then a current Q3i' flows through a path passing along Co, Lo, Q3, and Co, so that the energy is stored in the smoothing reactor Lo.

Next, when the switch Q2 is turned OFF and the switch Q1 is turned ON at time t3 (same as time t1), the switch Q3 is turned OFF and the switch Q4 is turned ON. Therefore, the energy stored in the smoothing reactor Lo is transferred to the capacitor C5 via the diode D5. That is, the diode D5 is activated and the energy is stored in the capacitor C5, so that a spike voltage is absorbed.

Subsequently, when the switch Q1 is turned OFF and the switch Q2 is turned ON at time t4 (same as time t2), a voltage at one end of the secondary winding 5b of the transformer T2 is applied to the gate of the switch Q3, thereby turning the switch Q3 ON state.

The waveform shaping circuit 11 applies the gate voltage signal Q5g to the gate of the switch Q5 to turn the switch Q5 ON state within a period of time from time t41 to time t42 (same as time t21 to time t22) after the switch Q2 is turned ON based on the voltage generated at one end of the tertiary winding 5c of the transformer T2. Therefore, the energy in the capacitor C5 is discharged through a path passing along C5, Q5, 5b, D3, and C5. The diode D3 is conductive because a current flows from the smoothing reactor Lo. Therefore, voltage is induced at the primary winding 5a of the transformer T2.

The voltage induced at the primary winding 5a causes a current Q2i' to flow clockwise through a path passing along 5a, Q2(D2), C2, and 5a, and therefore, the clamp capacitor C2 is charged. The energy stored in the clamp capacitor C2 transfers to an exciting inductance of the transformer T2, and is returned to the DC power source Vdc1 when the switch Q1 is turned ON.

As shown in FIG. 6, it is noted that the current Q5i flows during the ON-time of the switch Q2 (while the gate voltage signal Q2g has H-level) and also during the ON-time $T_{ON}$ of the switch Q5 (e.g., time t21 to time t22 or time t41 to t42), and that the energy is then returned to the clamp capacitor C2 on the primary side of the transformer T2. The return amount of energy is determined by the duration of the ON-time of the switch Q5, so that the return amount of energy can be controlled by adjusting the ON-time of the switch Q5.

Since the voltage Q3v of the switch Q3 is clamped, no spike voltage is generated, as shown in FIG. 6. Therefore, it is possible to set a withstand voltage of the switch Q3 to be a lower value. Accordingly, losses can be further reduced because a low ON-resistance device can be used.

As described above, according to the resonant DC conversion apparatus employing the active clamp topology in the first embodiment, the leakage inductance between the primary and the secondary windings of the transformer T2 is increased, and the resonance between this leakage inductance and the capacitor C1 is utilized so as to achieve the zero-voltage switching of the switches Q1 and Q2. This leakage inductance makes the generation of the spike voltage more remarkable. However, this spike voltage can be eliminated by transferring the energy stored in the smoothing reactor Lo to the capacitor C5 via the diode D5 due to a current backflow caused under light load condition and returning this energy to the clamp capacitor C2 on the primary side of the transformer T2 without any loss by use of the switch Q5 which is turned ON synchronously as the switch Q2 is ON. Therefore, the withstand voltage of a rectification device can be lowered, and ON-resistance can be reduced by using a low withstand-voltage device. Furthermore, a C-R absorber for preventing the spike voltage can be eliminated, thereby simplifying the circuitry.

Figure 7:
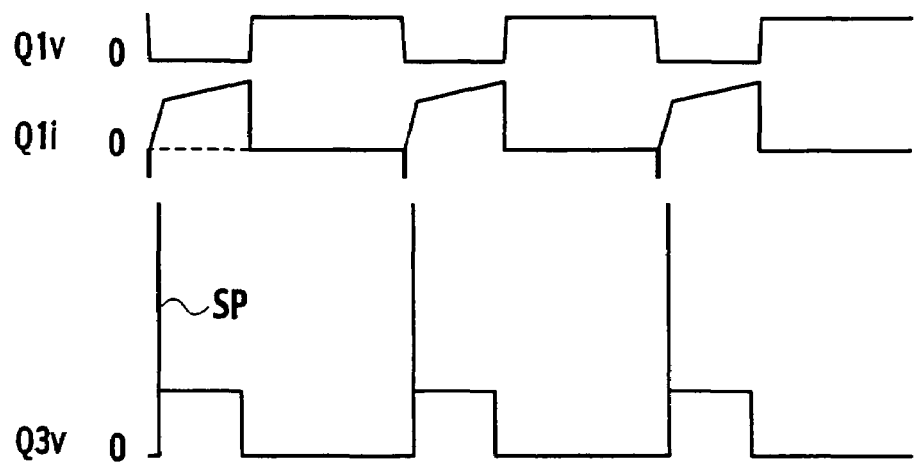
FIG. 7 is a timing chart of signals at each component under heavy load of the DC conversion apparatus when only a synchronous rectifying circuit is provided.
Figure 8:
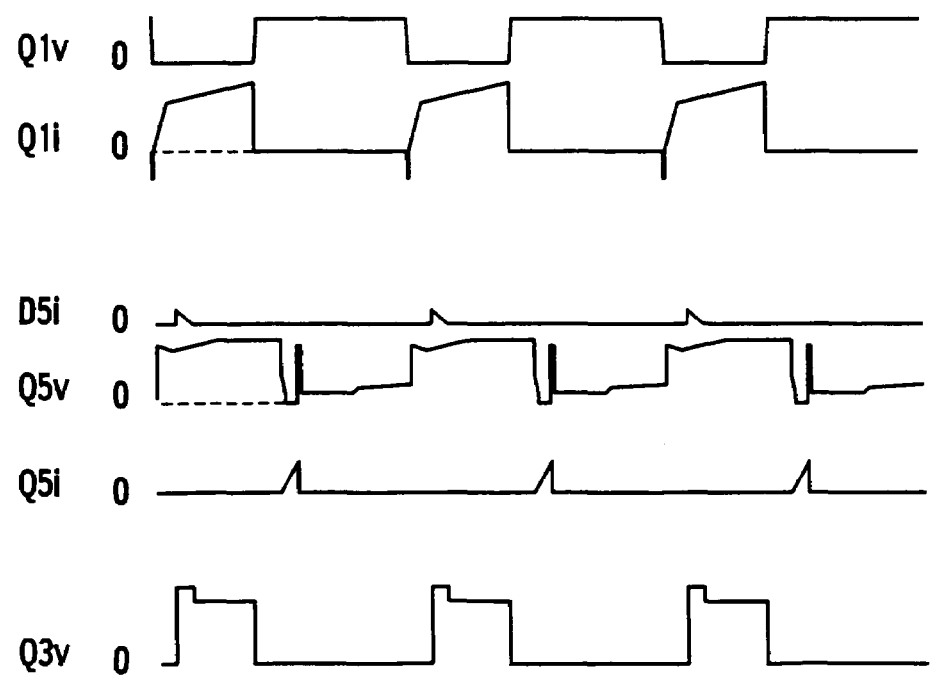
FIG. 8 is a timing chart of signal of each component under heavy load of the DC conversion apparatus according to the first embodiment.

FIG. 7 is a signal timing chart of each component under heavy load condition of the DC conversion apparatus in a case where only the synchronous rectifying circuit is provided. FIG. 8 is a signal timing chart of each component under heavy load condition of the DC conversion apparatus according to the first embodiment. As shown in FIG. 7, a spike voltage SP is generated across the switch Q3. In the first embodiment shown in FIG. 8, the generated spike voltage is clamped through the diode D5 by the voltage of the capacitor C5, so as to be suppressed. Furthermore, the diode D6 is provided to absorb the energy of the spike voltage generated at recovery time of the diode D4 in the capacitor C5, thereby suppressing the spike voltage. Therefore, low withstand voltage devices can be used for the switch Q3 and the diode D3, leading to reducing losses. Similarly, low withstand voltage devices can be used for the switch Q4 and the diode D4. Moreover, the waveform shaping circuit 11 can turn the switch Q5 ON state within a range between the first threshold voltage VTH1 and the second threshold voltage VTH2. That is, since the ON-time of the switch Q5 is set to be shorter than that of the switch Q2, the current of the switch Q5 under heavy load condition can be reduced. The ON-time of the switch Q5 is adjustable by changing the second threshold voltage VTH2.

Second Embodiment

Figure 9:
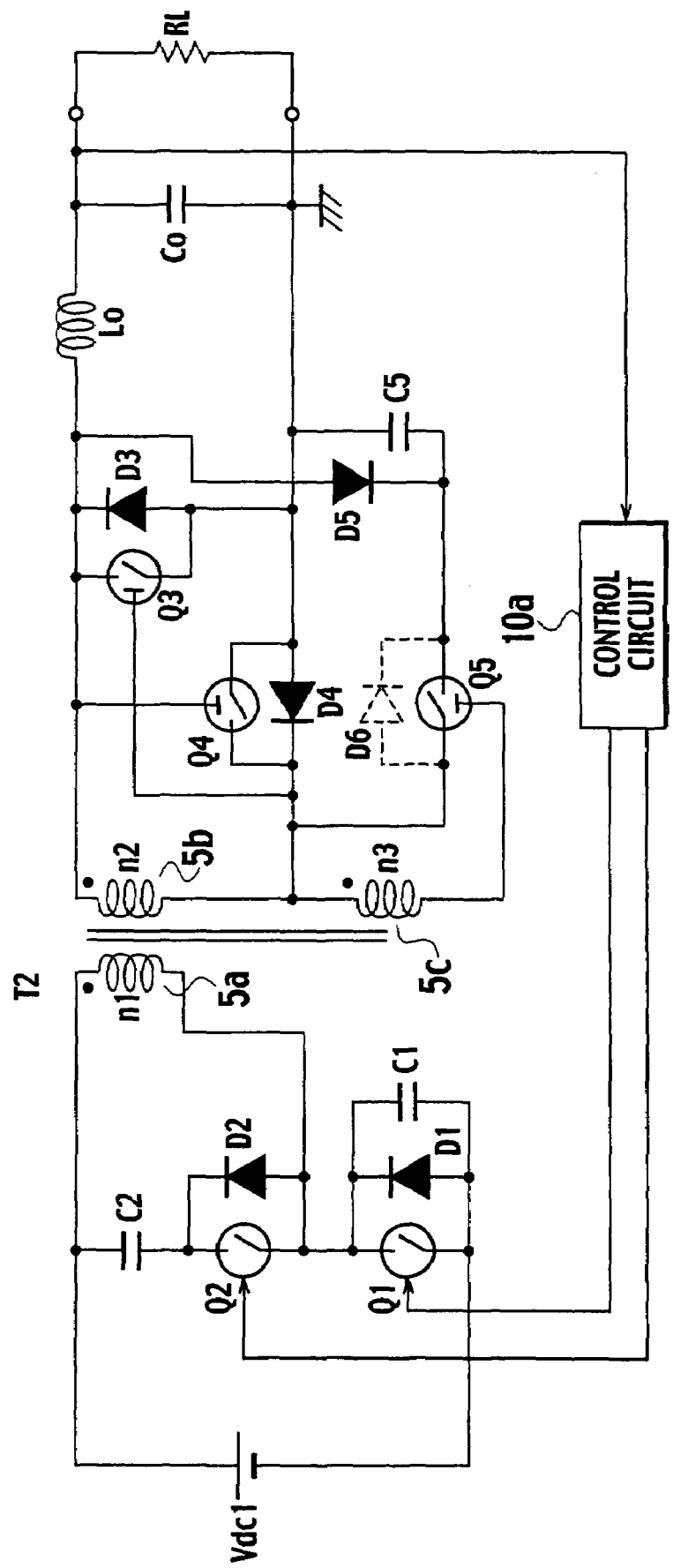
FIG. 9 is a circuit configuration diagram of a DC conversion apparatus according to a second embodiment.

FIG. 9 is a circuit configuration diagram of a DC conversion apparatus according to a second embodiment. The DC conversion apparatus shown in FIG. 9 is different from that of the first embodiment shown in FIG. 3 only in that the waveform shaping circuit 11 is not provided. Other configurations shown in FIG. 9 are the same as those shown in FIG. 3, so like reference signs denote like parts and details thereof will be omitted.

The DC conversion apparatus of the second embodiment also offers the same advantageous effect as that obtained from the DC conversion apparatus of the first embodiment.

Third Embodiment

Figure 10:
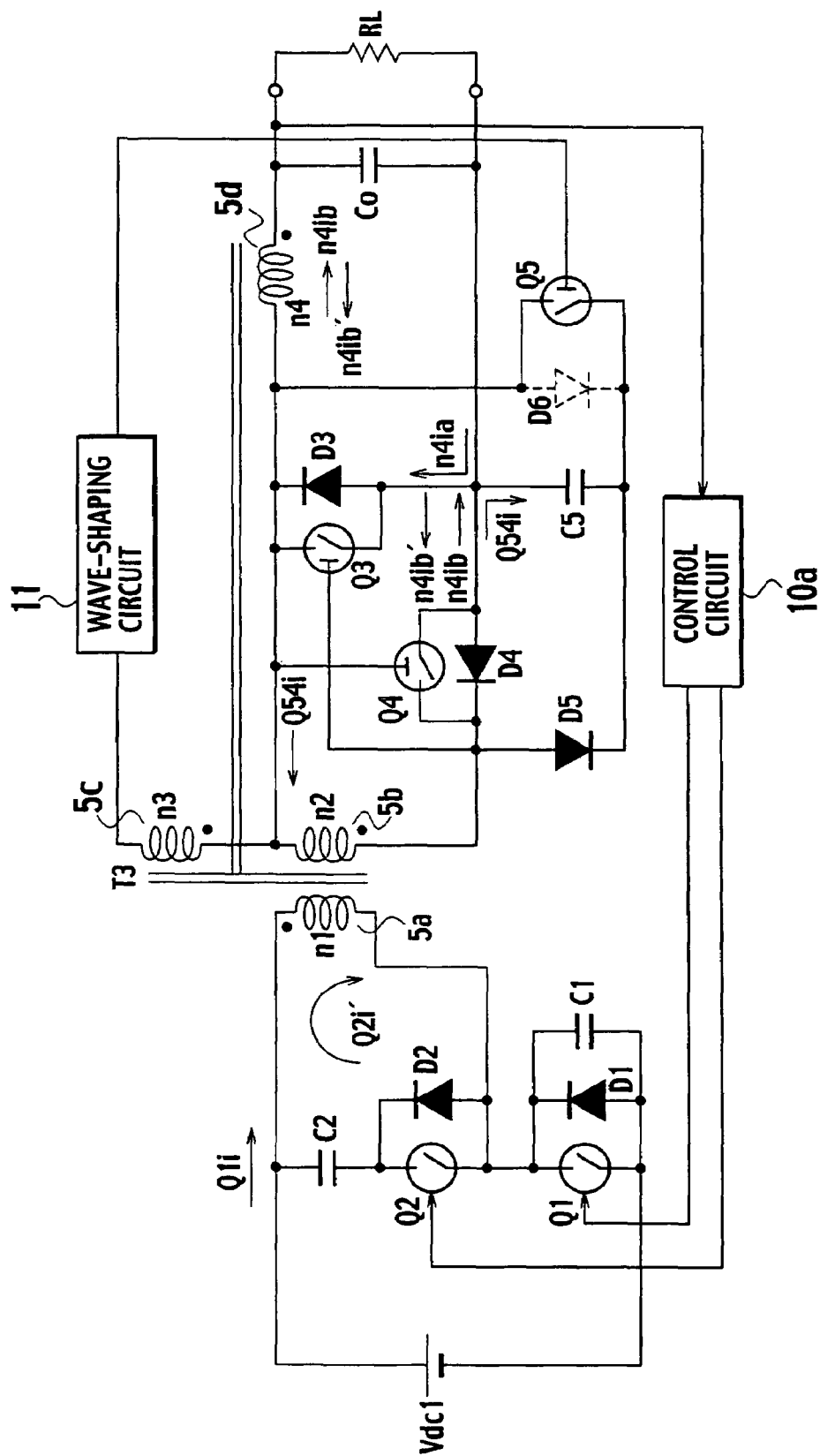
FIG. 10 is a circuit configuration diagram of a DC conversion apparatus according to a third embodiment.

FIG. 10 is a circuit configuration diagram of a DC conversion apparatus according to a third embodiment. The DC conversion apparatus shown in FIG. 10 is different from that of the first embodiment shown in FIG. 3 in that a transformer T3 has a primary winding 5a, a secondary winding 5b, a tertiary winding 5c, and a quaternary winding 5d that is corresponding to an auxiliary winding of the present invention (the number of turns is n4) and in that the primary winding 5a is loosely coupled with the quaternary winding 5d and is also tightly coupled with the secondary winding 5b and the tertiary winding 5c. Specifically, when the switch Q1 is ON, the DC excitation of the transformer T3 in its operating state is canceled by magnetomotive forces having the same magnitude but in opposite directions at the primary winding 5a and the quaternary winding 5d, and when the switch Q1 is OFF, the DC excitation of the transformer T3 in its operating state is canceled by magnetomotive forces having the same magnitude but in opposite directions at the secondary winding 5b and the quaternary winding 5d. Therefore, the exciting inductance can be increased, thereby reducing exciting current and thus reducing power losses.

The quaternary winding 5d is provided at a position corresponding to the smoothing reactor Lo shown in FIG. 3. The number of turns of the secondary winding 5b of the transformer T3 is the same as that of the quaternary winding 5d of the transformer T3. The secondary winding 5b and the tertiary winding 5c of the transformer T3 each have a winding phase opposite to that of the primary winding 5a of the transformer T3, and the quaternary winding 5d of the transformer T3 has the same winding phase as that of the primary winding 5a of the transformer T3.

The reverse mode voltage of the tertiary winding 5c described herein means that the tertiary winding 5c has a winding structure in relation to the primary winding 5a in such that a switch Q5 is turned OFF as the switch Q1 is ON and that the switch Q5 is turned ON as the switch Q1 is OFF.

The anode of the diode D5 is connected to a joint of the secondary winding 5b and the cathode of the diode D4, one end (drain) of the switch Q4, and the gate of the switch Q3. The cathode of the diode D5 is connected via the capacitor C5 to the anode of the diode D4, the anode of the diode D3, and one end of the smoothing capacitor Co. A joint of the diode D5 and the capacitor C5 is connected to one end (drain) of the switch Q5 and the cathode of the diode D6. The other end (source) of the switch Q5 and the anode of the diode D6 are connected to one end of the quaternary winding 5d and the cathode of the diode D3. The gate of the switch Q5 is connected to one end (no symbol side) of the tertiary winding 5c via the waveform shaping circuit 11.

Other configurations shown in FIG. 10 are the same as those in FIG. 3, so like reference signs denote like parts and details thereof will be omitted.

Figure 11:
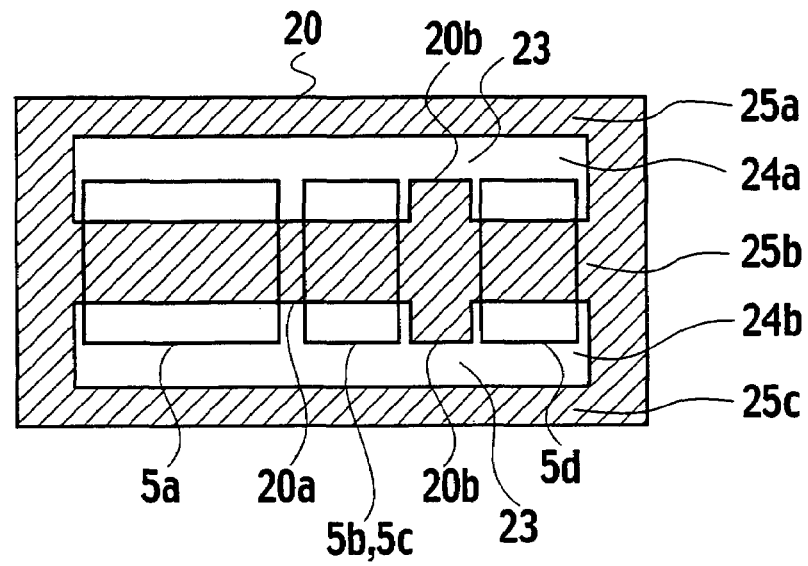
FIG. 11 is a configuration diagram of a transformer provided in the DC conversion apparatus according to the third embodiment.

FIG. 11 is a configuration diagram of the transformer provided in the DC conversion apparatus according to the third embodiment. The transformer shown in FIG. 11 includes a core 20 having a rectangular external shape and also having therein elongate apertures 24a and 24b that are formed to configure magnetic paths 25a, 25b, and 25c in a longitudinal direction thereof. The primary winding 5a, the secondary and the tertiary windings 5b and 5c closely and tightly coupled with the primary winding 5a, and the quaternary winding 5d loosely coupled with the primary winding 5a are provided in a core part 20a of the core 20. In order to loosely couple the primary winding 5a with the quaternary winding 5d, a projecting part 20b is formed between the secondary and the tertiary windings 5b and 5c, and the quaternary winding 5d in the core part 20a. A leakage flux increases at the projecting part 20b, resulting in a large leakage inductance of the quaternary winding 5d.

Operations of the DC conversion apparatus thus configured in the third embodiment will be explained with reference to a timing chart shown in FIG. 12.

Figure 12:
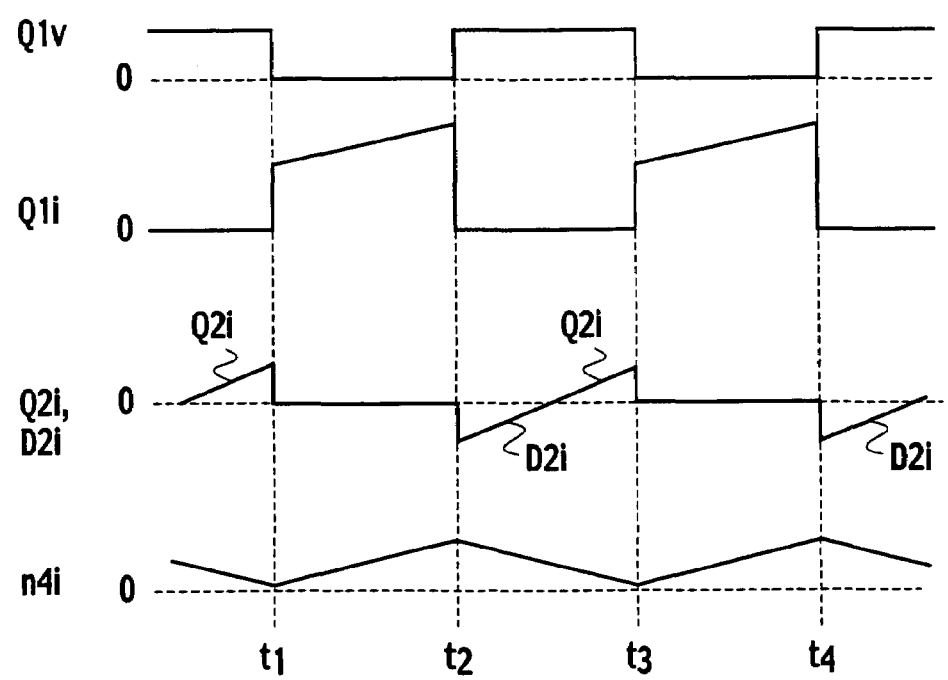
FIG. 12 is a signal timing chart of each component of the DC conversion apparatus according to the third embodiment.

In FIG. 12, a voltage across the switch Q1 is depicted by Q1v, a current flowing into the switch Q1 is depicted by Q1i, a current flowing into the switch Q2 is depicted by Q2i, a current flowing into the diode D2 is depicted by D2i, and a current flowing into the quaternary winding 5d of the transformer T3 is depicted by n4i.

Operations performed under heavy load condition are explained first. When the switch Q1 is turned ON at time t1, the current Q1i (equivalent to a current I1 flowing through the primary winding 5a) flows clockwise through a path passing along Vdc1, 5a, Q2, and Vdc1. At the same time, a voltage is generated at the quaternary winding 5d that is loosely coupled with the primary winding 5a, and then the current n4ia (equivalent to a current I1' corresponding to the current I1) flows clockwise through a path passing along 5d, Co, Q3, and 5d, so that electric power is supplied to a load RL. The quaternary winding 5d has a high leakage inductance as it is loosely coupled with the primary winding 5a. At this time, the relationship of $I1 \cdot n1 = I1' \cdot n4$ holds true according to the law of equal ampere-turns, and hence the DC excitation is canceled.

When the switch Q1 is turned OFF at time t2, a current flows due to exciting energy stored in the primary winding 5a, and then the capacitor C1 is charged. At this time, voltage resonance is produced by a leakage inductance (not shown) of the primary winding 5a of the transformer T3 and the capacitor C1, and the voltage Q1v of the switch Q1 increases abruptly.

When the electrical potential of the switch Q1 reaches that of the clamp capacitor C2, the diode D2 becomes conductive, and then the clamp capacitor C2 starts to be charged as the current D2i (shown in FIG. 12) flows through the diode D2. At this time, zero-voltage switching of the switch Q2 is achieved by turning the switch Q2 ON state.

Subsequently, the clamp capacitor C2 is completely charged, and the electrical charge stored therein is returned to the primary winding 5a via the switch Q2. At this time, the filled circle side of the primary winding 5a is negative, and the non-symbol side thereof is positive. Therefore, also on the secondary side of the transformer T3, the filled circle side of the secondary winding 5b is negative and the non-symbol side thereof is positive, and the filled circle symbol side of the quaternary winding 5d is negative and the non-symbol side thereof is positive. Furthermore, the current n4ib continues to flow clockwise through a path passing along 5b, 5d, Co, Q4, and 5b due to a leakage inductance (not shown) of the quaternary winding 5d. Therefore, a current always flows through the load RL irrespective of whether the switch Q1 is ON or OFF, so that a ripple current of the smoothing capacitor Co can be reduced.

Since the secondary winding 5b and the quaternary winding 5d of the transformer T3 have the same number of turns and opposite polarities, the magnetomotive forces of the both windings 5b and 5d are eliminated and become zero. That is, the DC excitation is canceled.

Accordingly, the impedance on the secondary side of the transformer T3 seen looking from the primary side thereof is increased, and when the switch Q2 is turned OFF at time t3 (same as time t1), the current of the switch Q2 is almost enough to discharge the energy in the capacitor C1. Therefore, the electrical potential of the switch Q1 decreases to zero, and then the diode D1 becomes conductive. At this time, zero-voltage switching of the switch Q1 can be achieved by turning ON the switch Q1.

On the other hand, in a case where a load current decreases (during light load condition), a current of the quaternary winding 5d flowing therethrough when the switch Q1 is turned OFF becomes zero while the switch Q1 is OFF state whereas the switch Q4 remains ON state. Therefore, the electric charge stored in the smoothing capacitor Co is discharged, and a current n4ib' flows through a path passing along Co, 5d, 5b, Q4, and Co, so that the energy is stored in the quaternary winding 5d.

Next, the switch Q2 is turned OFF and the switch Q4 is also turned OFF. Therefore, the energy stored in the quaternary winding 5d is transferred to the capacitor C5 via the diode D5. That is, the diode D5 is activated and the energy is stored in the capacitor C5, so that a spike voltage is absorbed.

Subsequently, the waveform shaping circuit 11 applies the gate voltage signal Q5g to the gate of the switch Q5 thereby to turn ON the switch Q5 after the switch Q2 is turned ON (during the ON-time of the switch Q2) according to the voltage generated at one end of the tertiary winding 5c of the transformer T3. Therefore, the energy in the capacitor C5 is discharged through a path passing along C5, Q5, 5b, Q4, and C5 (Q54i), so that a voltage is induced in the primary winding 5a of the transformer T3.

The voltage induced in the primary winding 5a causes a current Q2i' to flow through a path passing along 5a, Q2(D2), C2, and 5a, and therefore, the clamp capacitor C2 is charged. The energy stored in the clamp capacitor C2 transfers to an exciting inductance of the transformer T3, and is returned to the DC power source Vdc1 as the switch Q1 is turned ON. The return amount of energy is determined by the duration of the ON-time of the switch Q5, so that the return amount of energy can be controlled by adjusting the ON-time of the switch Q5.

Accordingly, since the voltage Q4v of the switch Q4 is clamped, no spike voltage is generated. Therefore, it is possible to set a withstand voltage of the switch Q4 to be a lower value. Therefore, losses can be further reduced because a low ON-resistance device can be used.

As described above, according to the DC conversion apparatus of the third embodiment, the energy stored in the quaternary winding 5d due to a current backflow caused under light load condition is stored in the capacitor C5 via the diode D5, and this energy is returned to the clamp capacitor C2 on the primary side of the transformer T3 without any loss by use of the switch Q5 that is turned ON synchronously when the switch Q2 is ON, so that the spike voltage can be eliminated.

The diode D6 suppresses the spike voltage, by absorbing the energy of the spike voltage generated at recovery time of the diode D3 in the capacitor C5. Therefore, a low withstand voltage device can be used, thereby reducing power losses.

The quaternary winding 5d is provided on the secondary side of the transformer T3, the primary winding 5a and the quaternary winding 5d are loosely coupled with each other, and the primary winding 5a and the secondary winding 5b are tightly coupled with each other. When the switch Q1 is ON, the DC excitation of the transformer T3 in its operating state is canceled by magnetomotive forces having the same magnitude but in opposite directions at the primary winding 5a and the quaternary winding 5d, and when the switch Q1 is OFF, the DC excitation of the transformer T3 in its operating state is canceled by magnetomotive forces having the same magnitude but in opposite directions at the secondary winding 5b and the quaternary winding 5d. Therefore, the exciting inductance can be increased, leading to a reduced exciting current and thus to reduced losses. Furthermore, zero-voltage switching can be achieved, and a compact, highly efficient, and low-noise DC conversion apparatus can be obtained.

Fourth Embodiment

Figure 13:
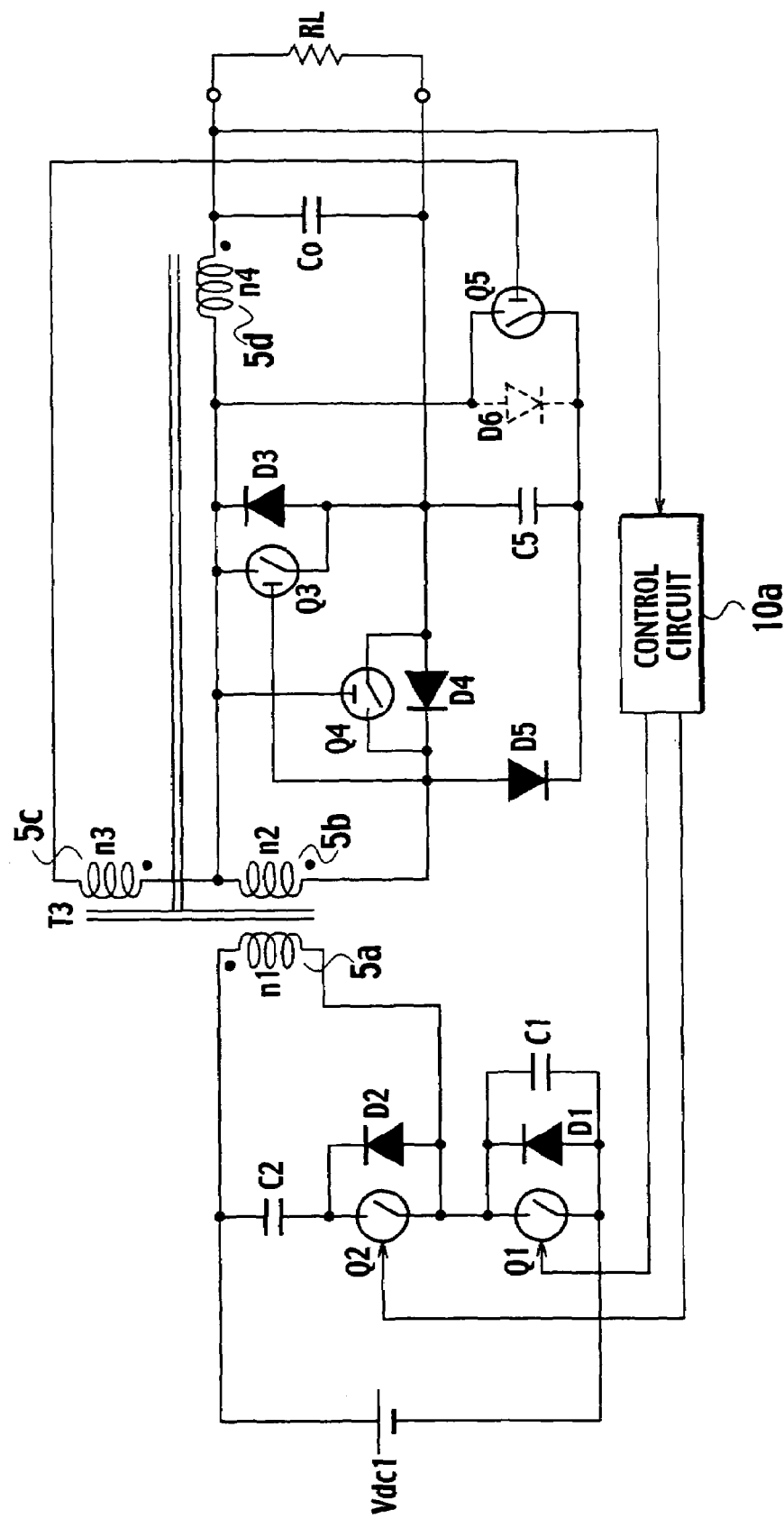
FIG. 13 is a circuit configuration diagram of a DC conversion apparatus according to a fourth embodiment.

FIG. 13 is a circuit configuration diagram of a DC conversion apparatus according to a fourth embodiment. The DC conversion apparatus shown in FIG. 13 is different from that of the third embodiment shown in FIG. 10 only in that the waveform shaping circuit 11 is removed. Other configurations shown in FIG. 13 are the same as those shown in FIG. 10, so like reference signs denote like parts and details thereof will be omitted.

The DC conversion apparatus in the fourth embodiment can also offer the same advantageous effect as that obtained from the DC conversion apparatus in the third embodiment.

Advantages of the Invention

According to the present invention, the energy stored in a smoothing reactor due to a current backflow caused under light load condition is stored in a capacitor via a diode, and this energy is returned to a clamp capacitor on the primary side without any loss by use of a third switch that is turned ON synchronously when a second switch is ON, so that a spike voltage can be eliminated. Therefore, a withstand voltage of a device used for a synchronous rectifier can be lowered, so that a low withstand-voltage device can be used. Furthermore, a circuit that causes losses, such as a surge absorber, is not necessary, and therefore losses can be reduced. Accordingly, a highly efficient and compact DC conversion apparatus can be obtained.

INDUSTRIAL APPLICABILITY

The present invention is applicable to a switching power supply, such as a DC-DC converter and an AC-DC converter.

This application claims benefit of priority under 35USC §119 to Japanese Patent Applications No. 2004-381758, filed on Dec. 28, 2004, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A DC conversion apparatus comprising:
   a first switch configured to carry out ON/OFF operations via a primary winding of a transformer to convert a DC voltage provided by a DC power source into a high-frequency voltage;
   a series circuit of a second switch and a clamp capacitor, the series circuit being connected to both ends of the primary winding of the transformer or to both ends of the first switch;
   a synchronous rectifying circuit configured to carry out synchronous rectification of a high-frequency voltage generated at a secondary winding of the transformer;
   a smoothing circuit having a smoothing reactor and a smoothing capacitor configured to smooth a rectified output of the synchronous rectifying circuit and output a DC voltage;

a storage capacitor configured to store energy being stored in the smoothing reactor and transferred thereto via a diode due to a current backflow of the synchronous rectifying circuit under a light load condition;

a third switch configured to turn ON in synchronization with the second switch and to return the energy stored in the storage capacitor to the clamp capacitor on the primary side via the transformer; and a control circuit configured to alternately turn ON/OFF the first switch and the second switch.

2. The DC conversion apparatus according to claim 1, wherein the smoothing reactor is formed on an auxiliary winding of the transformer, the secondary winding of the transformer is tightly coupled with the primary winding of the transformer, and the auxiliary winding of the transformer is loosely coupled with the primary winding.

3. The DC conversion apparatus according to claim 2, wherein the number of turns of the secondary winding of the transformer is the same as that of the auxiliary winding, the secondary winding has a winding phase opposite to that of the primary winding of the transformer, and the auxiliary winding has the same winding phase as that of the primary winding.

4. The DC conversion apparatus according to claim 1, comprising a tertiary winding of the transformer being connected to the secondary winding of the transformer in series, wherein the third switch is turned ON by a voltage generated at the tertiary winding of the transformer as the second switch is turned ON and the energy stored in the storage capacitor is returned to the clamp capacitor on the primary side via the transformer.

5. The DC conversion apparatus according to claim 2, comprising a tertiary winding of the transformer being connected to the secondary winding of the transformer in series, wherein the third switch is turned ON by a voltage generated at the tertiary winding of the transformer as the second switch is turned ON and the energy stored in the storage capacitor is returned to the clamp capacitor on the primary side via the transformer.

6. The DC conversion apparatus according to claim 4, wherein the tertiary winding of the transformer has a winding phase opposite to that of the primary winding of the transformer.

7. The DC conversion apparatus according to claim 1, further comprising an ON-time setting means setting an ON-time of the third switch to be shorter than that of the second switch.

8. The DC conversion apparatus according to claim 2, further comprising an ON-time setting means setting an ON-time of the third switch to be shorter than that of the second switch.

9. The DC conversion apparatus according to claim 4, further comprising an ON-time setting means setting an ON-time of the third switch to be shorter than that of the second switch.

10. The DC conversion apparatus according to claim 1, wherein the synchronous rectifying circuit has a parallel circuit of a synchronous rectifying device and a rectification device being connected to one end of the secondary winding of the transformer and to one end of the smoothing capacitor, and also has a second diode being connected to a joint of the one end of the secondary winding and a cathode of the rectification device, and to one end of the storage capacitor, and upon recovery phase of the rectification device, the recovery energy is absorbed in the storage capacitor via the second diode.

11. The DC conversion apparatus according to claim 2, wherein the synchronous rectifying circuit has a parallel circuit of a synchronous rectifying device and a rectification device being connected to one end of the secondary winding of the transformer and to one end of the smoothing capacitor, and also has a second diode being connected to a joint of the one end of the secondary winding and a cathode of the rectification device, and to one end of the storage capacitor, and upon recovery phase of the rectification device, the recovery energy is absorbed in the storage capacitor via the second diode.

12. The DC conversion apparatus according to claim 4, wherein the synchronous rectifying circuit has a parallel circuit of a synchronous rectifying device and a rectification device being connected to one end of the secondary winding of the transformer and to one end of the smoothing capacitor, and also has a second diode being connected to a joint of the one end of the secondary winding and a cathode of the rectification device, and to one end of the storage capacitor, and upon recovery phase of the rectification device, the recovery energy is absorbed in the storage capacitor via the second diode.

* * * * *